United States Patent
Chovan et al.

(10) Patent No.: US 7,038,780 B2
(45) Date of Patent: May 2, 2006

(54) METHOD FOR SENSING ACOUSTIC ENERGY

(75) Inventors: Joseph Lawrence Chovan, North Syracuse, NY (US); Donald William Winfield, Camillus, NY (US); Lawrence Richard Snowman, Liverpool, NY (US); William Arthur Penn, Baldwinsville, NY (US); Walter Beeman, Nikomis, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 464 days.

(21) Appl. No.: 10/177,790

(22) Filed: Jun. 20, 2002

(65) Prior Publication Data

US 2006/0028651 A1 Feb. 9, 2006

(51) Int. Cl.
*G01N 21/00* (2006.01)
(52) U.S. Cl. ............... 356/432; 73/861.18; 73/587; 73/606
(58) Field of Classification Search ............... 356/432; 73/861.18, 861.23, 861.28, 861.34, 587, 73/606, 643
See application file for complete search history.

(56) References Cited

U.S. PATENT DOCUMENTS

| 4,683,750 | A | * | 8/1987 | Kino et al. ............... 73/606 |
| 5,798,835 | A | * | 8/1998 | Kotidis et al. ............ 356/432 |
| 6,057,927 | A | * | 5/2000 | Levesque et al. .......... 356/432 |
| 6,130,859 | A | * | 10/2000 | Sonnenschein et al. ..... 367/134 |
| 6,395,770 | B1 | * | 5/2002 | Broder et al. ............. 514/449 |
| 6,552,336 | B1 | * | 4/2003 | Lloyd et al. ............. 73/861.19 |

* cited by examiner

*Primary Examiner*—Layla G. Lauchman
(74) *Attorney, Agent, or Firm*—Plevy, Howard & Darcy, PC

(57) ABSTRACT

A method for sensing acoustic energy as the energy passes from a more dense to a less dense medium while compensating for energy level loses that may have occurred along the acoustic path of the acoustic energy. The method may be used to replace a multi-sensor system for detecting acoustic energy. The method includes permitting the acoustic energy to progress from a first transmitting medium to a second transmitting medium, the first transmitting medium being more dense than the second transmitting medium and the first medium being contiguous with the second medium along a predetermined interface; disposing an optical sensor in the second medium so that at least a portion of the acoustic energy imposes a modulation proportional to the frequency components of the acoustic energy on a sampling light emitted by the optical sensor; and detecting at least a portion of the sampling light having modulation in response to the portion of the acoustic energy.

17 Claims, 1 Drawing Sheet

METHOD FOR SENSING ACOUSTIC ENERGY

FIELD OF THE INVENTION

This invention relates to a method for sensing acoustic energy or waves, and, more particularly, to a method for sensing acoustic waves that have passed from a more dense transmitting medium, like water, to a less dense transmitting medium, like air.

BACKGROUND OF THE INVENTION

Sensors have been used to detect acoustic waves that originate in a transmitting medium by disposing the sensors in that transmitting medium. For example, a conventional transducer may be disposed in water for detecting water borne acoustic signals. Likewise, a microphone may be disposed in air for detecting airborne acoustic signals. Such sensors have also been used to detect acoustic signals in the less and more dense medium respectively.

However, in certain applications, it may be desirable to detect in a less dense transmitting medium acoustic energy that originated in or passed through a more dense transmitting medium and traveled across an interface with a less dense transmitting medium, while compensating for energy level losses that may have occurred along the acoustic path of the acoustic energy. Further, conventional sensing systems may require that multiple dispersed transducers and/or microphones be deployed for achieving desired sensitivity. It may be difficult, uneconomical, infeasible, and time consuming to effect such deployment. Therefore, it would be desirable to employ an apparatus and method which does not necessarily require multiple sensors.

An apparatus for sensing airborne acoustic waves that is useful in practicing the present invention is described and claimed in U.S. patent application Ser. No. 06/864,481, filed May 19, 1986 and assigned to the present assignee, which is incorporated herein by reference thereto.

SUMMARY OF THE INVENTION

In accordance with the present invention, in an exemplary embodiment a method for detecting acoustic energy having predetermined frequency components is presented, comprising permitting the acoustic energy to progress from a first transmitting medium to a second transmitting medium, the first transmitting medium being more dense than the second transmitting medium and the first medium being contiguous with the second medium along a predetermined interface; disposing an optical sensor in the second medium so that at least a portion of the acoustic energy imposes a modulation proportional to the frequency components of the acoustic energy on a sampling light emitted by the optical sensor; and detecting at least a portion of the sampling light having modulation in response to the portion of the acoustic energy.

The invention itself, however, both as to organization and method of operation, may best be understood by reference to the detailed description taken in connection with the accompanying drawings. Therefore, the scope of protection is not limited by the summary of an exemplary embodiment set out above, but is only limited by the claims.

DETAILED DESCRIPTION OF A PREFERRED EMBODIMENT

Figure 1:
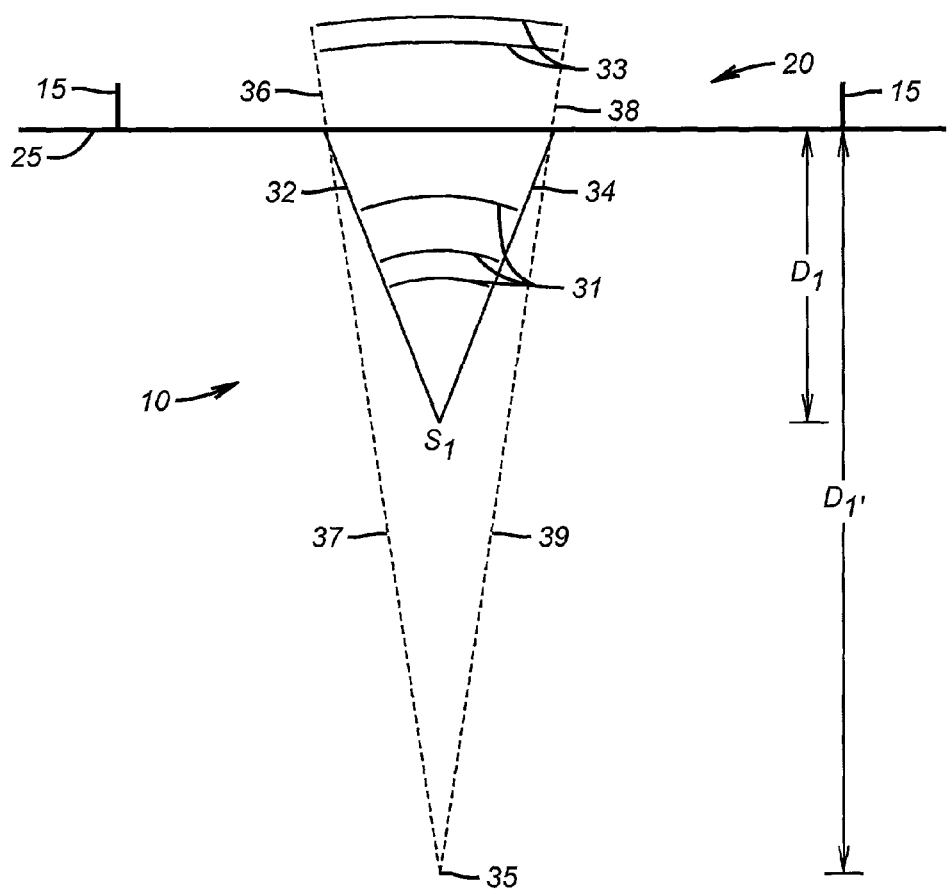
FIG. 1 is a schematic diagram of respective representations of the envelope of a portion of an acoustic wavefront as it progresses from a more dense to a less dense transmitting medium that are useful for understanding operation of the present invention.

Referring to FIG. 1, respective representations of the envelope of a portion of an acoustic wavefront as it progresses from a more dense to a less dense transmitting medium that is useful for understanding operation of the present invention is shown.

In a preferred embodiment, acoustic energy having predetermined frequency components is detected by permitting the acoustic energy to progress from first transmitting medium 10 to second transmitting medium 20 where first transmitting medium 10 is more dense than second transmitting medium 20 and first medium 10 is contiguous with second medium 20 along a predetermined interface, e.g. 25. Optical sensor 100 (shown in FIG. 2) is disposed in second medium 20 so that at least a portion of the acoustic energy imposes a modulation proportional to the frequency components of the acoustic energy on sampling light 110 (shown in FIG. 2) emitted by optical sensor 100. Once optical sensor 100 is disposed, optical sensor 100 may be used to detect at least a portion of sampling light 110 having modulation in response to the portion of the acoustic energy. The acoustic energy may impose a modulation proportional to the frequency components of the acoustic energy.

Optical sensor 100 may be used to replace a plurality of acoustic sensors (not shown in the figures) disposed in first medium 10 with a single optical sensor 100 disposed in second medium 20. In a preferred embodiment, sampling light 110 is a laser light.

Modulation from the detected portion of sampling light 110 may be recovered so as to identify content of the acoustic energy. By way of example, first source designated $S_1$ of acoustic energy is shown disposed in first transmitting medium 10. Acoustic energy emanating from source $S_1$ may propagate omnidirectionally through medium 10. For purposes of this discussion and to avoid undue clutter in the figure, an acoustic wave or wavefront 31 of interest may be assumed to progress within a conic volume or envelope in medium 10, bounded by representative meridonal lines 32 and 34. It is also noted that all points along the same arc of a wavefront are equidistant in time from the acoustic source providing that medium 10 is homogenous with respect to acoustic velocity therein.

Transmitting medium 10 is contiguous with a second transmitting medium 20 along mutual interface 25. Medium 10 is denser than medium 20 so that acoustic waves in medium 10 will travel faster in medium 10 than they do in medium 20. By way of example and not of limitation, medium 10 may include a fluid such as water, e.g. a natural body of water such as an ocean or lake. Medium 20 may include a fluid such as air. Medium 20 must be able to have a coherent beam of electromagnetic energy pass through it without material attenuation or modulation when medium 20 is in a quiescent state as will become apparent with the following description of the invention and is therefore preferably transparent or nearly so to the selected electromagnetic monitoring energy.

Representative positions of wavefront 31 in medium 10 (three of which are shown) may be considered to be arcs formed by sections of the circumference of corresponding concentric circles having points $S_1$ as their center. At interface 25, meridonal lines 32 and 34 are bent toward a normal, or vertical, 15 to interface 25 that is disposed at the intersection of lines 32 and 34 with interface 25 respectively so that lines 36 and 38 constitute the respective margins of the envelope of energy as wavefront 31 passes from medium 10 to medium 20.

If margin lines 36 and 38 are extended back along themselves through interface 25 it is noted that they intersect at a point 35 that is disposed below source $S_1$ at a distance $D_1'$, into medium 10 from interface 25, whereas source $S_1$ is shown actually situated at a distance $D_1$ into medium 10 from interface 25. Because of the nature of the bending or refraction that occurs at interface 25 due to the difference in velocity between the acoustic signal in media 10 and 20 as previously described, distance $D_1'$ will be larger than distance $D_1$. Thus bending of the envelope boundaries creates an apparent shift in the position of source $S_1$ away from boundary 25 as viewed from medium 20.

As wavefront 31 passes from medium 10 to medium 20 it progresses along wavefront 33. As a simplification, representative portions of wavefront 33 (two of which are shown) may be considered in the plane of the paper to be arcs formed by sections of the circumference of corresponding concentric circles having point 35 as their center. Thus wavefront 33 will have a larger radius of curvature than any wavefront 31.

The foregoing description with respect to FIG. 1 was a simplified explanation of events regarding refraction and propagation of an acoustic wave from a more dense to a less dense transmitting medium. In actuality, as acoustic wavefront 31 leaves source $S_1$, sound pressure in medium 10 decreases with spherical spreading. At boundary 25, a portion of the acoustic energy from source $S_1$ is reflected back into medium 10 because of the mismatch in acoustic impedance between medium 10 and 20 at interface 25. Another portion of the acoustic energy from source $S_1$ passes through interface 25.

In medium 20 directly above source $S_1$, the acoustic wavefront is spherical and the radius of curvature $R_c$ of that wave front is represented by $$R_c = D_1 C_w / C_a + R_a \qquad (1)$$

wherein medium 10 is assumed to be water as indicated by the subscript (w), medium 20 is assumed to be air as indicated by the subscript (a), $R_a$ is the length of the acoustic ray in medium 20 above interface 25, $D_1$ is the depth or distance into medium 10 of source $S_1$ from interface 25, and C is the velocity of sound in the medium indicated by the corresponding subscript (e.g. "w" for water or medium 10 and "a" for air or medium 20).

Other than directly above source $S_1$, the acoustic wavefront is aspheric and can be characterized at any point by two radii of curvature, $R_k$ and $R_v$, wherein:

$R_k$ is the radius of curvature of the wavefront in medium 20 in the plane of FIG. 1, and $R_v$ is the radius of curvature of the wavefront in medium 20 in the plane that contains the acoustic ray to the point in medium 20 and that is also perpendicular to the plane of FIG. 1.

In each of the planes of radii $R_v$ and $R_k$, the wavefront cross section spreads out from a virtual or apparent source located at $R_v$ and $R_k$, respectively, into medium 10 from interface 25. The radii $R_v$ and $R_k$ may be represented as:

$$R_k = C_w D_1 \cos^2\theta_a / C_a \cos^3\theta_w = C_w \cos^2\theta_a R^3{}_w / C_a D_1{}^2 \qquad (2)$$

and $$R_v = R_w C_w / C_a \qquad (3)$$

both of which revert to the first term in equation (1) above for radius $R_c$ when the acoustic ray extends directly above source $S_1$, i.e. when angle $\theta_w$ equals zero. Thus radii $R_v$ and $R_k$ are always independently greater than or equal to radius $R_c$.

Figure 2:
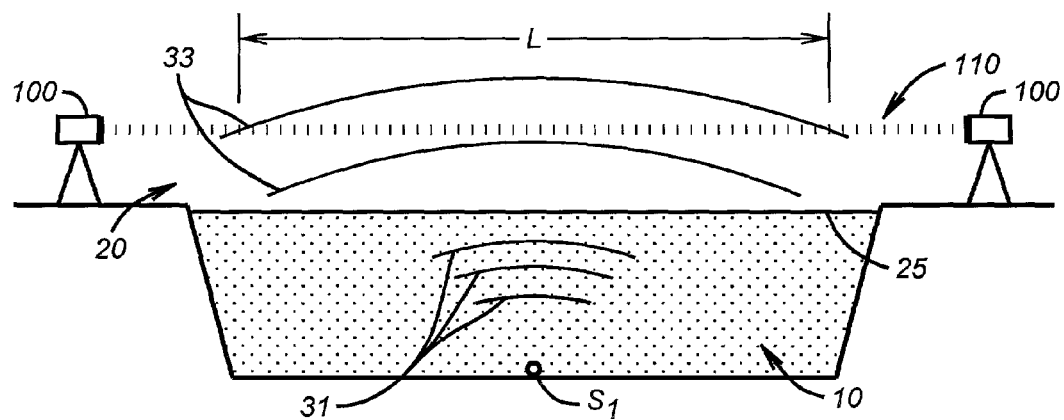
FIG. 2 is a simplified pictorial representation of an environment in which the present invention may be practiced.

Referring to FIG. 2, a simplified representation of an environment in which the present invention may be practiced is shown. The aforementioned U.S. patent application Ser. No. 06/864,481, describes an apparatus useful for practicing the present invention. Only so much of the apparatus as is necessary to an understanding of the present invention will be presented here.

FIG. 2 illustrates sampling light 110, shown as sensing laser beam 110 emitted by optical sensor 100 which is illustrated as a laser send/receive pair in FIG. 2, deployed in air over a body of water. Sampling light 110 is used to monitor underwater sound source $S_1$. The details of the operation of laser sensing beam 110 are presented in U.S. patent application Ser. No. 06/864,481, incorporated herein by reference. The basic principle involves sound interacting with sensing laser beam 110 to produce phase modulation of sensing laser beam 110. Sound is a traveling pressure wave, e.g. 33, that alternately compresses and then rarefies the air containing sensing laser beam 110. These fluctuations in the air density cause corresponding modulations in the optical refractive index of the air. Further, these fluctuations cause modulations of the optical transit time and hence the optical phase of sensing laser beam 110 as it travels through the sensing region. Details of recovering these optical phase modulations are presented in the referenced U.S. patent application Ser. No. 06/864,481.

In a preferred embodiment, optical heterodyning is employed to transfer the phase modulation from an optical carrier frequency of around the order of $10^{14}$ Hz to an IF electronic carrier frequency of around the order of $10^8$ Hz. A variety of FM demodulation techniques, as will be familiar to those of ordinary skill in the art, are then available for recovering the acoustic signal of interest from the phase modulated IF carrier.

Long interaction length, e.g. "L" in FIG. 2, between sensing laser beam 110 and acoustic wavefronts 33 is important to the method embodiments claimed herein. Snell's law acting on the acoustic wavefronts at the water to air interface 25 significantly increase the radius of curvature of the acoustic wavefronts. This causes the compression and rarefaction to be uniform over a long length L of sensing laser beam 110, resulting in a large integrated effect of corresponding phase modulation. This long interaction length L is more than adequate to compensate for the large acoustic power loss in air due to the reflection at the water to air interface 25.

In a preferred embodiment, the interaction length L of sensing laser beam 110 equals the square root of ($\Lambda$R), where $\Lambda$ is the acoustic wavelength at sensing laser beam 110 and R is the range from sensing laser beam 110 to the apparent location of the underwater acoustic point source, e.g. 35. Thus, the increased R values discussed above (equations 2, 3) result in increased interaction length, enhancing acoustic sensitivity of the system. Long interaction lengths, e.g. "L" in FIG. 2, permit adequate sensitivity to compensate for the acoustic reflection loss encountered at the air/water interface 25. By detailed mathematical analysis, applicants have determined that the increase in laser acoustic interaction length for acoustic signal processing in accordance with U.S. patent application Ser. No. 06/864,481 is due to the apparent flattening of the acoustic wavefront 33 (or the apparent increase of its perceived radius of curvature) which permits interaction over a greater length of the detecting electromagnetic energy and more than compensates for the increase in transmission loss or attenuation of the acoustic energy in medium 10, even when source $S_1$ is disposed at substantial depths below interface 25.

While the present invention has been described above in terms of specific examples, it is to be understood that the invention is not intended to be confined or limited to the examples disclosed herein. On the contrary, the present invention is intended to cover various structures and modifications thereof included within the spirit and scope of the appended claims.

What is claimed is:

1. A method for detecting acoustic energy having predetermined frequency components, comprising:
    (a) permitting the acoustic energy to progress from a first transmitting medium to a second transmitting medium, the first transmitting medium being more dense than the second transmitting medium and the first medium being contiguous with the second medium along a predetermined interface;
    (b) disposing an optical sensor in the second medium for emitting a sampling light so that at least a portion of the acoustic energy progressed from the first transmitting medium in the second transmitting medium imposes a modulation proportional to the frequency components of the acoustic energy on the sampling light emitted by the optical sensor; and
    (c) detecting at least a portion of the sampling light having modulation in response to the portion of the acoustic energy.

2. The method as in claim 1, further comprising recovering the modulation from the detected portion of the sampling light so as to identify content of the acoustic energy.

3. The method as in claim 2, wherein the first medium is water and the second medium is air.

4. The method as claim 3, wherein the water is a natural body of water and the interface is a portion of the surface of the natural body of water, so that acoustic events occurring under the surface of the water may be identified.

5. The method as in claim 3, wherein the sampling light is a laser.

6. A method for detecting acoustic energy emanated from a source in a first transmitting medium, the first transmitting medium being contiguous with a second transmitting medium along a predetermined interface, the first transmitting medium being more dense than the second transmitting medium, the energy having frequency components, comprising:
    (a) providing a sampling light in the second transmitting medium so that at least a portion of the acoustic energy after progressing from the first transmitting medium to the second transmitting medium imposes a modulation proportional to the frequency components of the acoustic energy on the sampling light; and
    (b) detecting at least a portion of the sampling light having modulation in response to the portion of the acoustic energy.

7. The method as in claim 6, further comprising recovering the modulation from the detected portion of the sampling light so as to identify content of the acoustic energy.

8. The method as in claim 7 wherein the first medium is water and the second medium is air.

9. The method as in claim 8, wherein the water is a natural body of water and the interface is a portion of the surface of the natural body of water, so that acoustic events occurring under the surface of the water may be identified.

10. The method as in claim 6, wherein the sampling light is a laser.

11. The method as in claim 6, wherein the detecting of step (b) further comprises using phase modulation from the sampling light having a predetermined optical carrier frequency.

12. The method of claim 11 wherein the phase modulation from the optical carrier having a first predetermined frequency is shifted to an IF electronic carrier having a second predetermined frequency.

13. The method of claim 12 wherein the optical carrier first predetermined frequency is around $10^{14}$ Hz and the IF electronic carrier second predetermined frequency is around $10^8$ Hz.

14. The method of claim 12 further comprising employing optical heterodyning to transfer the phase modulation from the optical carrier having a first predetermined frequency to the IF electronic carrier having a second predetermined frequency.

15. The method of claim 14 wherein the first predetermined optical carrier frequency is around $10^{14}$ Hz and the second predetermined IF electronic carrier frequency is around $10^8$ Hz.

16. The method of claim 4, wherein the sampling light has a path substantially parallel to the interface between the water and the air.

17. The method of claim 9, wherein the sampling light has a path substantially parallel to the interface between the water and the air.

* * * * *